United States Patent
Zuo et al.

(10) Patent No.: US 7,119,993 B2
(45) Date of Patent: Oct. 10, 2006

(54) ACTUATOR ASSEMBLY INCLUDING A CIRCUIT ASSEMBLY AND A DAMPER THEREFOR

(75) Inventors: Xu Zuo, Prior Lake, MN (US); Xiaohong Sun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 230 days.

(21) Appl. No.: 10/714,061

(22) Filed: Nov. 14, 2003

(65) Prior Publication Data

US 2005/0105405 A1    May 19, 2005

(51) Int. Cl.
*G11B 21/08* (2006.01)
(52) U.S. Cl. .................................... 360/264.2
(58) Field of Classification Search ............. 360/264.2, 360/265.7, 97.02
See application file for complete search history.

(56) References Cited

U.S. PATENT DOCUMENTS

| | | | |
|---|---|---|---|
| 4,819,094 A * | 4/1989 | Oberg ..................... | 360/245.9 |
| 4,982,300 A | 1/1991 | Forbord | |
| 5,262,907 A | 11/1993 | Duffy et al. | |
| 5,422,764 A | 6/1995 | McIlvanie | |
| 5,526,208 A * | 6/1996 | Hatch et al. ............. | 360/294.1 |
| 5,583,724 A | 12/1996 | Kim et al. | |
| 5,587,855 A * | 12/1996 | Kim ........................ | 360/97.02 |
| 5,606,477 A | 2/1997 | Erpelding et al. | |
| 5,644,452 A | 7/1997 | Cox et al. | |
| 5,663,855 A | 9/1997 | Kim et al. | |
| 5,712,580 A | 5/1998 | Andress et al. | |
| 5,757,580 A | 5/1998 | Andress et al. | |
| 5,761,184 A | 6/1998 | Dauber et al. | |
| 5,801,905 A | 9/1998 | Schirle et al. | |
| 5,805,387 A * | 9/1998 | Koester ..................... | 360/265.7 |
| 5,867,348 A * | 2/1999 | Suwa ....................... | 360/265.2 |
| 5,914,836 A | 6/1999 | Pottebaum | |
| 5,930,071 A | 7/1999 | Back | |
| 5,965,249 A | 10/1999 | Sutton et al. | |
| 5,999,374 A | 12/1999 | Kim | |
| 6,021,019 A | 2/2000 | Genheimer et al. | |
| 6,091,574 A | 7/2000 | Misso | |
| 6,175,469 B1 | 1/2001 | Ahmad et al. | |

(Continued)

FOREIGN PATENT DOCUMENTS

CN    PCT/CN03/00570    *    7/2003

OTHER PUBLICATIONS

"Damped Voice Coil/Bobbin Assembly", IBM Technical Disclosure Bulletin, vol. 16, Issue 6, p. 1816, Publication Date Nov. 1, 1973.

*Primary Examiner*—Allen Cao
(74) *Attorney, Agent, or Firm*—Fellers, Snider, et al.

(57) ABSTRACT

Apparatus and method for damping operational vibration modes of an actuator assembly. The actuator assembly preferably supports a data transducing head adjacent a storage medium in a servo track writing environment. The actuator assembly further supports a circuit assembly comprising circuit board, card or other circuit portion to facilitate electrical communication with the data transducing head. A damping assembly is interposed between the circuit assembly and the actuator assembly to mechanically decouple the circuit assembly from the actuator assembly. Preferably, the damper assembly comprises one or more rigid damper plates and one or more viscoelastic layers therebetween to provide constrain layer damping. As desired, the plates can be provided with progressively larger thickness dimensions in a direction away from the actuator assembly.

15 Claims, 7 Drawing Sheets

U.S. PATENT DOCUMENTS

| | | |
|---|---|---|
| 6,236,531 B1 | 5/2001 | Allsup et al. |
| 6,422,080 B1 * | 7/2002 | Lalouette .................. 73/579 |
| 6,477,042 B1 * | 11/2002 | Allgeyer et al. ............ 361/685 |
| 6,512,658 B1 * | 1/2003 | Jierapipatanakul et al. ...... 360/264.7 |
| 6,563,676 B1 * | 5/2003 | Chew et al. ............. 360/264.7 |
| 6,744,597 B1 * | 6/2004 | Nguyen et al. .......... 360/234.5 |
| 6,757,136 B1 | 6/2004 | Buske et al. |
| 6,879,466 B1 * | 4/2005 | Oveyssi et al. .......... 360/265.7 |
| 6,947,260 B1 * | 9/2005 | Dominguez et al. ........ 360/265 |
| 2003/0169537 A1 * | 9/2003 | Weichelt et al. ......... 360/265.9 |
| 2004/0066583 A1 * | 4/2004 | MacLeod ................. 360/265.9 |
| 2004/0240119 A1 * | 12/2004 | Nakamura et al. ....... 360/264.2 |
| 2004/0264057 A1 * | 12/2004 | Iwahara et al. .......... 360/245.9 |
| 2005/0013055 A1 * | 1/2005 | Ho et al. ................. 360/264.2 |

* cited by examiner

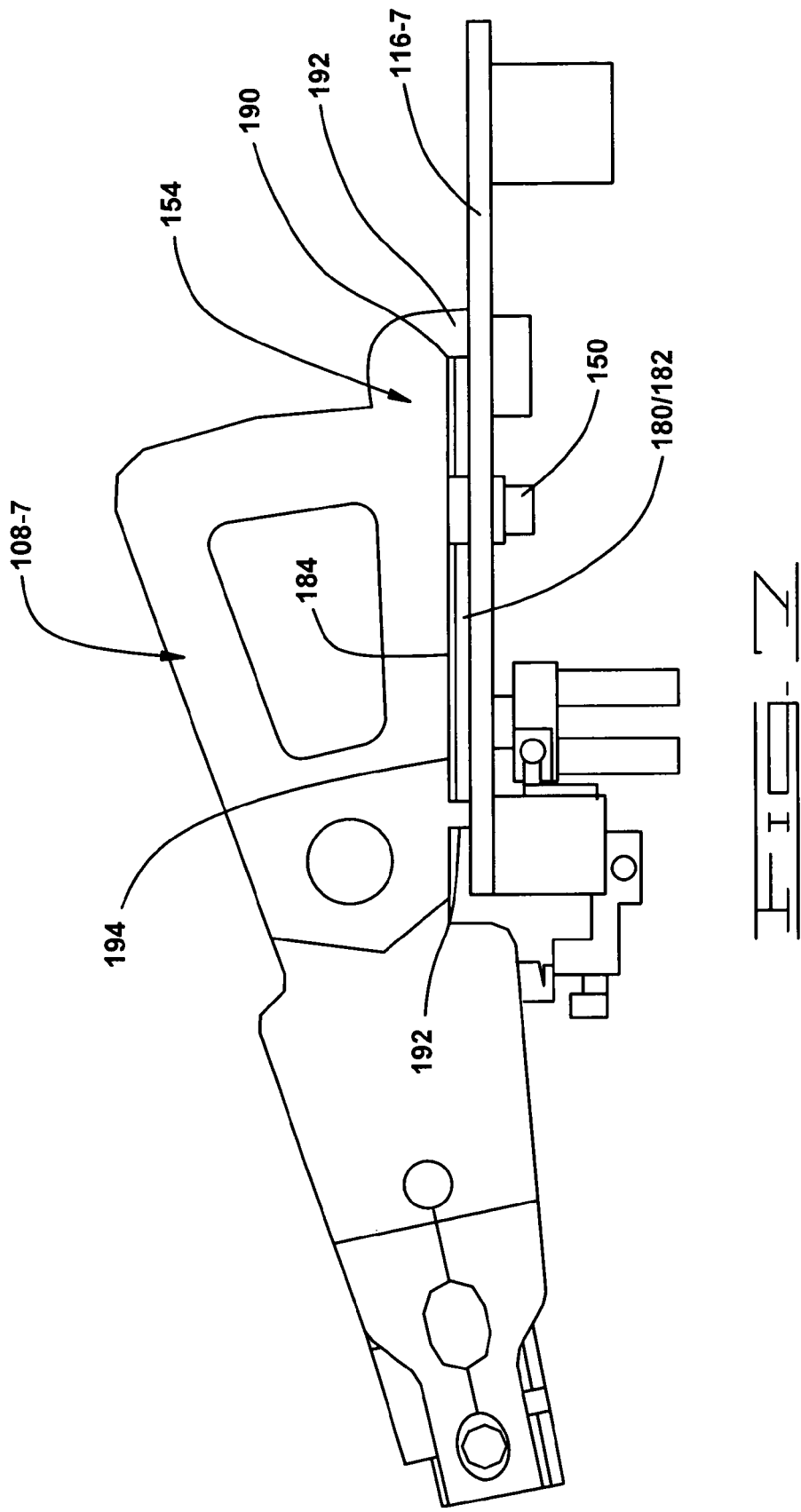

ACTUATOR ASSEMBLY INCLUDING A CIRCUIT ASSEMBLY AND A DAMPER THEREFOR

FIELD OF THE INVENTION

The present invention relates generally to a damping assembly for an actuator assembly, and more particularly but not by limitation to a damping assembly for an interface between a circuit board or circuit portion and head actuator assembly.

BACKGROUND OF THE INVENTION

Data storage devices store digitally encoded information on discs. Heads read data from or encode or record information to discs or other data storage media. Heads are positioned relative to selected data tracks via operation of a head actuator assembly. The head actuator assembly typically includes an actuator block having a plurality of actuator arms extending therefrom having heads or head suspension assemblies coupled thereto. The heads are coupled to circuitry through an circuit board or circuit portion mounted or supported by the head actuator assembly. The actuator block is actuated or moved by a drive assembly or motor to position the actuator arms and heads relative to select data tracks on the disc surface to read or write information relative to the disc. Vibration of the actuator assembly can interfere with placement of the heads relative to the disc surface or in particular interfere with head positioning for recording servo information or patterns on a disc or discs. Embodiments of the present invention provide solutions to these and other problems and offer other advantages over the prior art.

SUMMARY OF THE INVENTION

The present invention relates to an actuator assembly including a damping assembly between a circuit board or circuit portion and actuator block or body. The damping assembly is designed to control vibration modes of the actuator block excited via vibration of the circuit board or interface therefor. Other features and benefits that characterize embodiments of the present invention will be apparent upon reading the following detailed description and review of the associated drawings.

BRIEF DESCRIPTION OF THE DRAWINGS

FIG. 7 is a top view illustrating the damping assembly between the actuator body and the circuit board or circuit portion.

DETAILED DESCRIPTION OF ILLUSTRATIVE EMBODIMENTS

Figure 1:
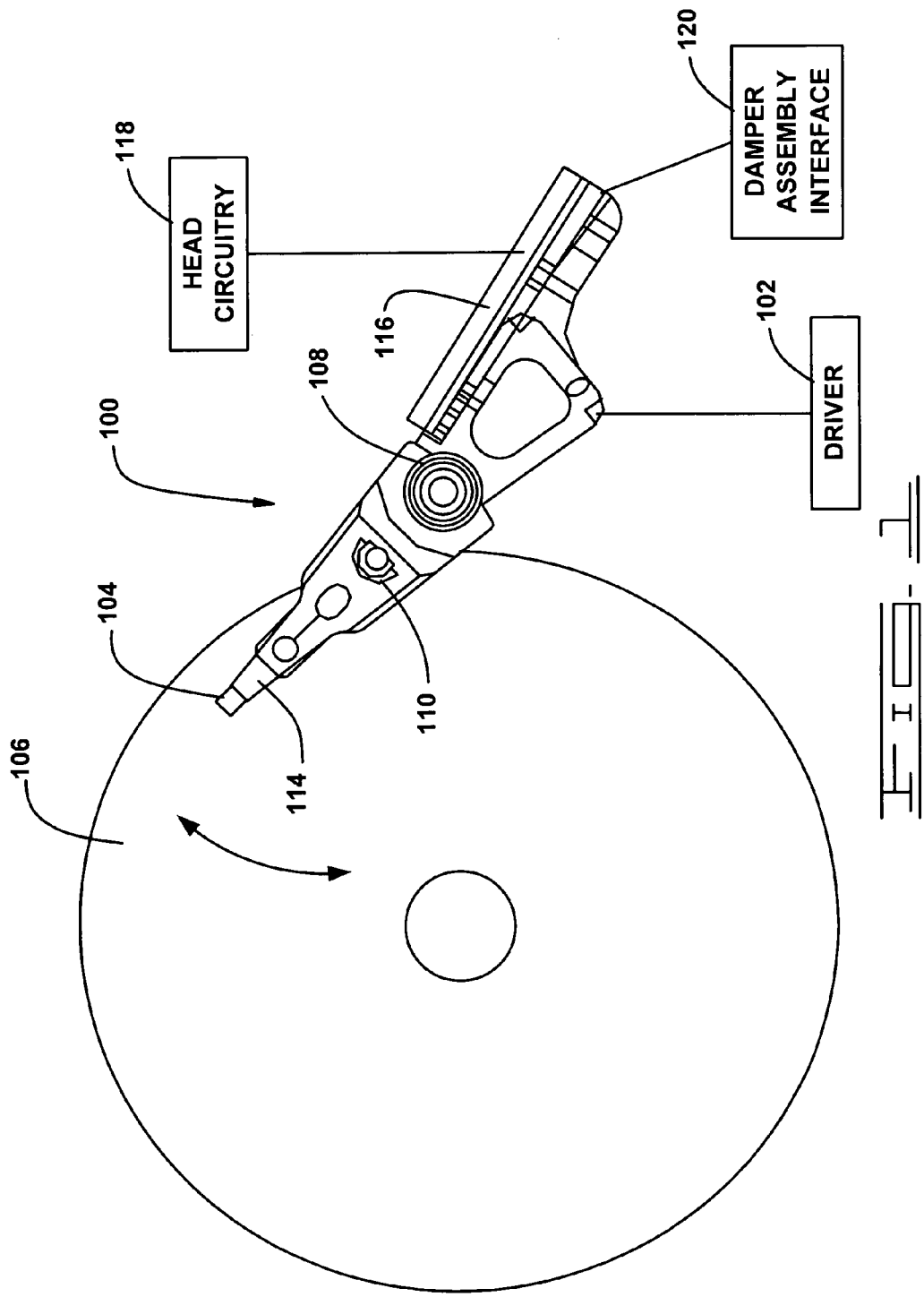
FIG. 1 schematically illustrates an embodiment of an actuator assembly including an actuator block and circuit board or circuit portion and a damping assembly or interface therebetween.

FIG. 1 schematically illustrates a head actuator assembly 100 which is movably supported via drive assembly 102 to position a head (or heads) 104 relative to a disc or data storage medium 106. In particular as shown, the head actuator assembly 100 includes an actuator block 108 having at least one actuator arm 110 extending therefrom. Head suspension assembly (or suspension assemblies) 114 are coupled to the actuator arm 110 to read or write (or encode) information relative to the data storage medium or disc 106. As shown, a circuit board or circuit portion (pre-amp card) 116 is secured relative to the actuator body 108 to provide an electrical interface between circuitry 118 and heads of the head suspension assemblies 114. The present invention relates to a damper assembly or damping interface 120 as illustrated schematically between the actuator block or body 108 and the circuit board or circuit portion 116 to limit or control excitation of vibration modes of the actuator assembly to reduce head placement errors.

Figure 2:
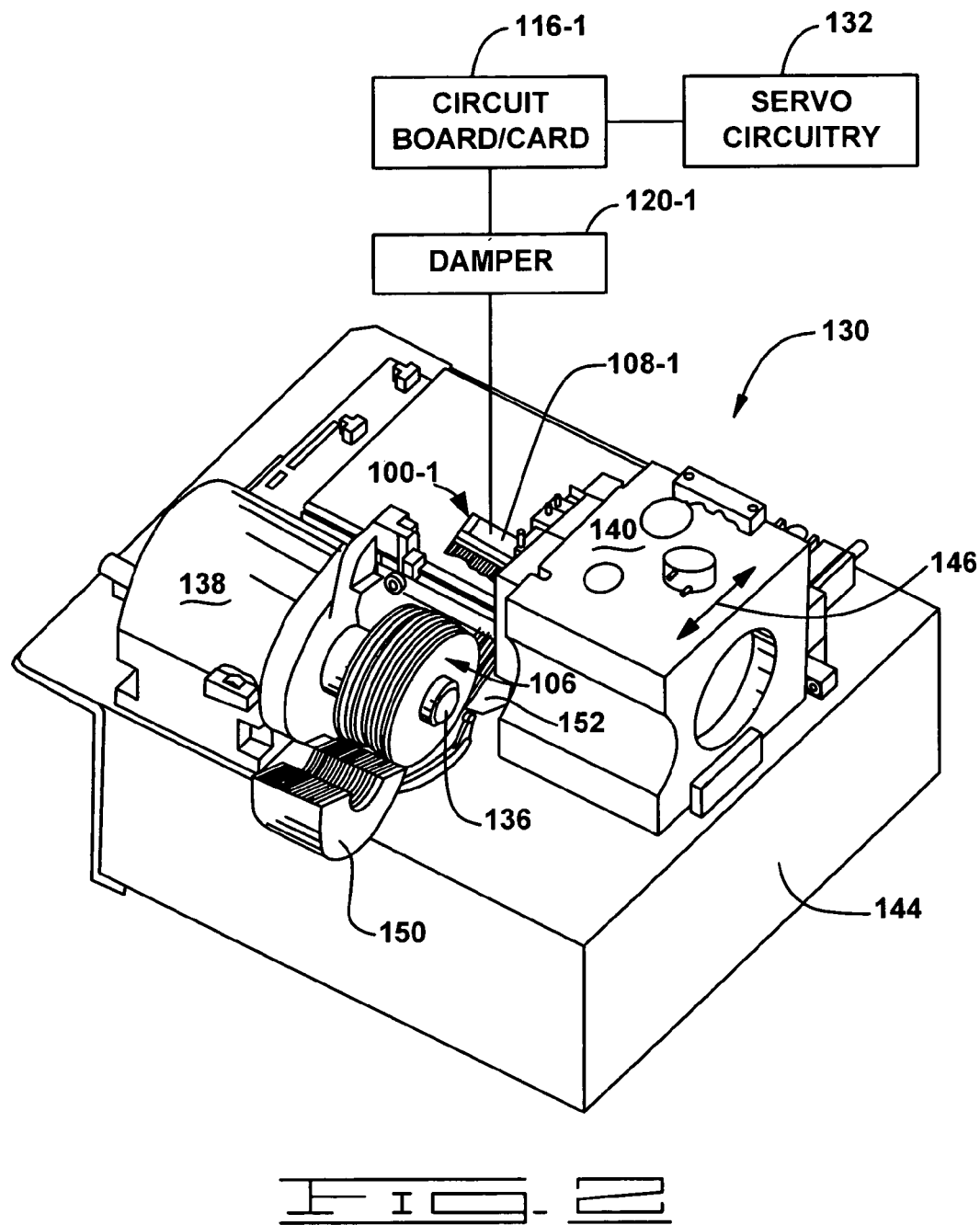
FIG. 2 schematically illustrates an embodiment of a servo track writing apparatus including an actuator assembly having an actuator block and circuit board or circuit portion and including a damping assembly therebetween.
Figure 3:
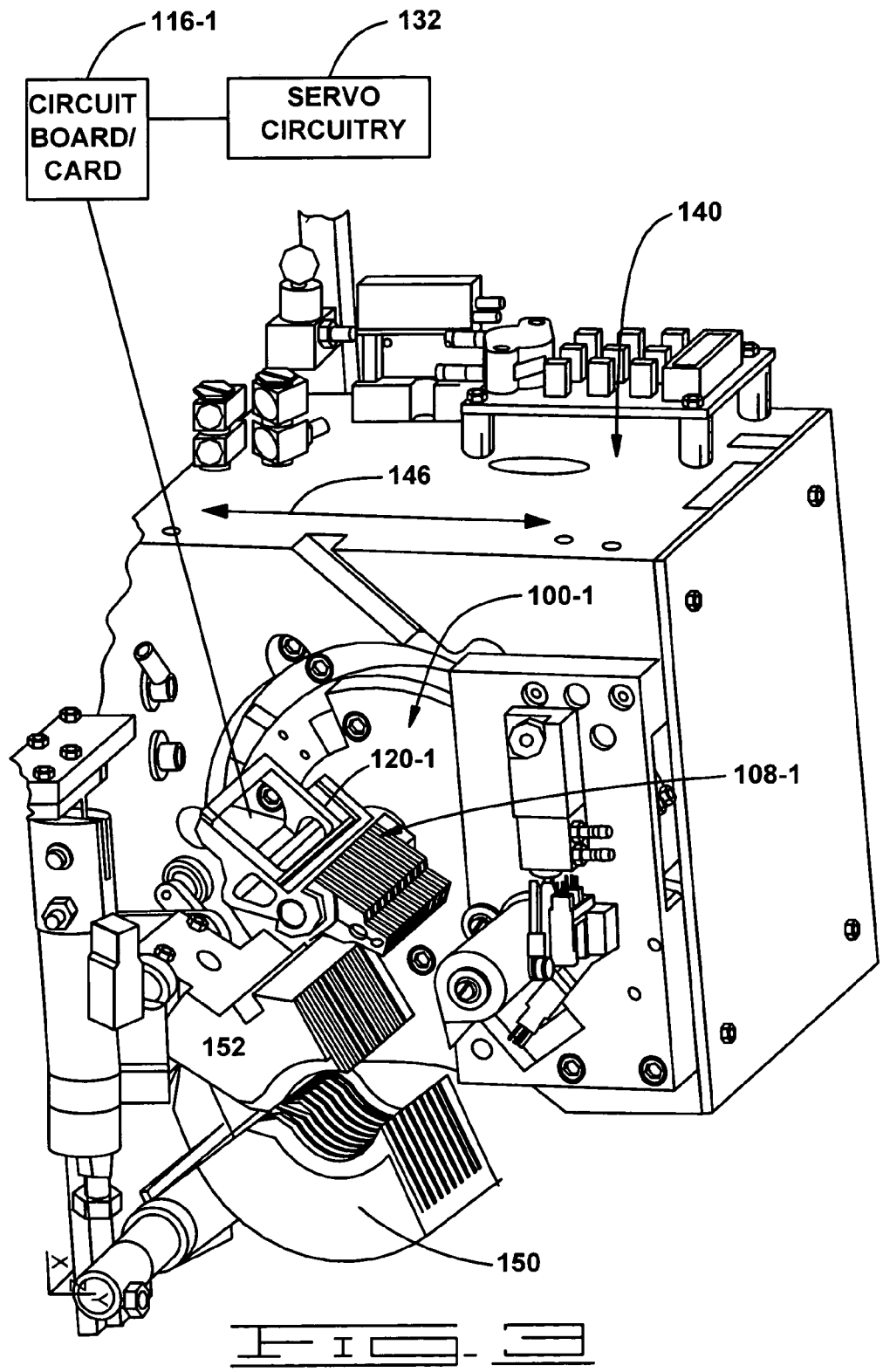
FIG. 3 is a schematic illustration of an embodiment of a servo track writing apparatus including an actuator block and circuit board or circuit portion and including a damping assembly therebetween.

As previously discussed, heads 104 are positioned relative to a disc or discs to read data from or write data (or encode servo information) to a disc or discs. Heads are positioned relative to data tracks on the disc or discs via a servo control system including servo information or patterns encoded on a disc or discs. For example, servo patterns or information can be encoded on a disc or discs between data sectors of each track of a disc "embedded servo information" or on a surface of a dedicated disc or "dedicated servo". Servo information or patterns are pre-recorded or written during manufacture of data storage devices for example, via a dedicated servo track writing apparatus 130 as illustrated in FIGS. 2–3. In the illustrated servo track writing apparatus 130, servo track information is recorded on a plurality of discs of a disc stack simultaneously to form a multiple disc servo track writing apparatus.

Embodiments of the damping assembly or damping interface have application for servo track writing apparatus and in particular for the multiple disc servo track writing apparatus 130 of FIG. 3. As shown the servo track writing apparatus 130 includes a head actuator assembly 100-1, which as shown in FIGS. 2–3, includes an actuator block 108-1. For encoding servo information or patterns a plurality of heads (or head suspension assemblies) are coupled to cantilevered actuator arms of the actuator block 108-1. The plurality of heads (or head suspension assemblies) are coupled to servo writing circuitry 132 to encode or record servo information through a circuit board or circuit portion 116-1 coupled to the actuator block as schematically illustrated in FIGS. 2–3. For reference, the element 116-1 is also referred to herein as a circuit assembly.

Discs 106 (or disc stack—not shown in FIG. 3) are supported on a spindle hub 136 of a spindle block or assembly 138 for rotation by a spindle driver (not shown). The actuator block or assembly is coupled to a servo block 140 to position heads relative to a disc or discs supported on the spindle hub 136 to encode servo patterns or information on the discs or discs. For operation, discs are loaded onto the spindle hub 136 and are merged with the plurality of actuator arms or heads of the actuator assembly or block 108-1 to simultaneously recorded servo information to the plurality of discs 106 of the disc stack. In the illustrated embodiment, the spindle hub 136 has a generally horizontal position relative to a platform or base 144 (such as a granite platform or base) to vertically support discs (or a plurality of discs) for vertically orientated servo writing.

Discs are removably secured relative to the spindle hub 136 by a clamp. In the particular embodiment illustrated in FIG. 2, spindle hub 136 is stationary supported relative to the rigid platform or base 144 by spindle block 138 and the actuator block or assembly is movably supported relative to the base or platform 144 as illustrated by arrow 146 via servo block 140 to move or position the actuator block 108-1 and heads between a retracted position (shown in FIG. 2) and a merged position (not shown FIG. 2) to record servo information to the discs.

In particular, the actuator assembly or actuator arms are retracted to load and unload discs on the spindle hub 136 and are merged to record servo information. As shown, the spindle assembly 138 includes an air dam 150 and stripper 152 which are movable between an opened position (shown in FIG. 2) to load and unload discs and a closed position to record servo information. Although in the illustrated embodiment, servo block 140 is movably supported relative to spindle block or assembly 138 to merge the heads suspension assemblies (heads) and discs, application is not so limited and the spindle block or assembly 138 or both the spindle block 138 and servo block 140 can be movable between a retracted position and a merged position to merge the heads and discs. Platform or base 144 is formed of a relatively impact or vibration resistant structure, such as a granite slab, to restrict movement of the apparatus or components during the servo writing process.

Figure 4:
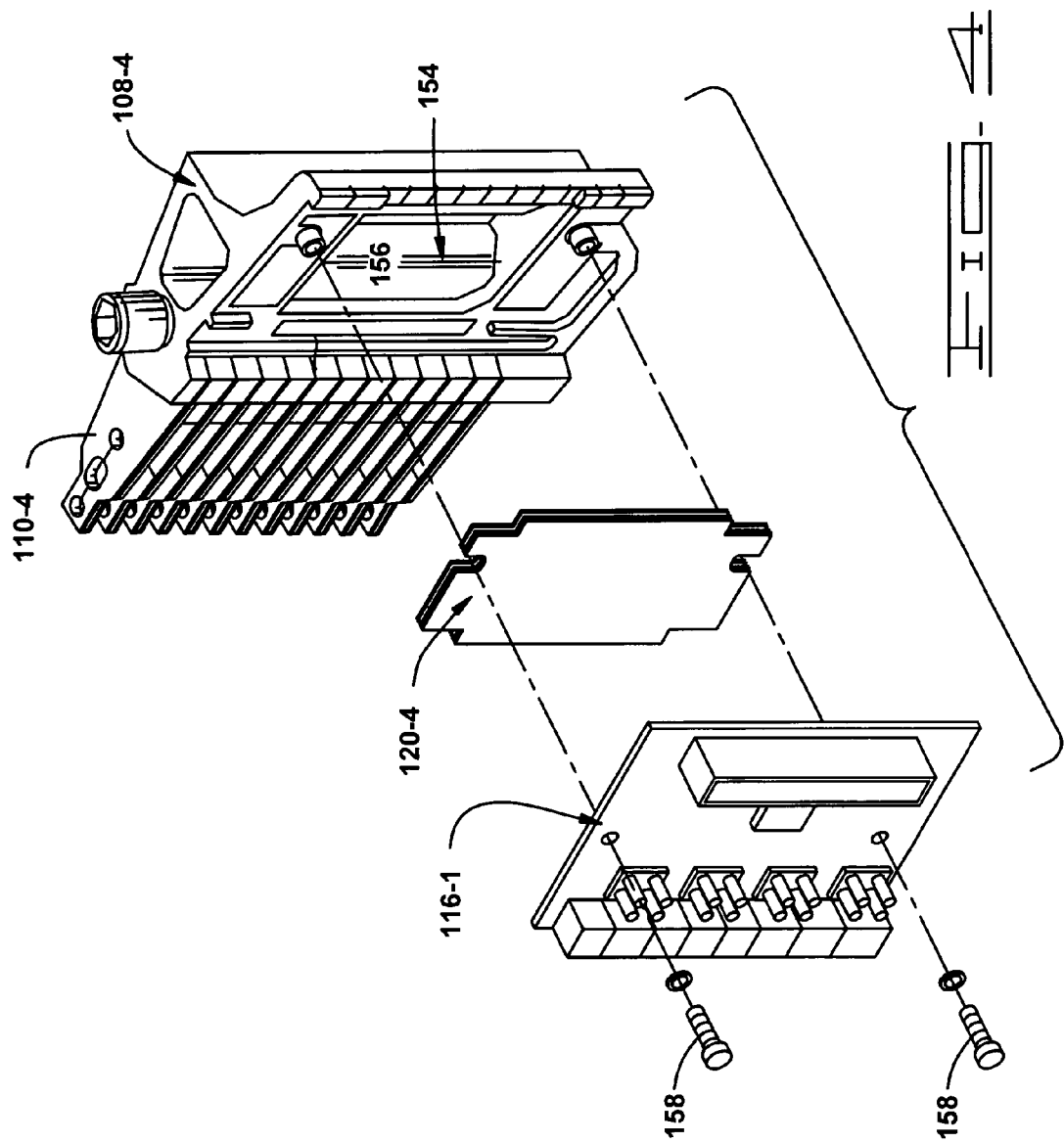
FIG. 4 is an exploded illustration of an embodiment of an actuator block and circuit board or circuit portion having a damping assembly interposed therebetween.

During operation vibration of the circuit board or circuit portion (pre-amp card) can excite vibration modes of the actuator block or assembly interfering with head placement. The present invention provides a damping assembly or interface 120-1 as schematically shown in FIGS. 2–3 between the circuit board or card 116-1 to limit or control excitation of vibration modes of the actuator block or body 108-2. In the embodiment illustrated in FIG. 4, the damping assembly 120-4 is coupled between a circuit interface portion 154 of the actuator body 108-4 and the circuit board 116-1. In the embodiment shown, the circuit interface portion 154 includes a window portion 156 to reduce inertia and mass of the actuator assembly. Damping assembly 120-4 is secured between the circuit interface portion 154 and the circuit board 116-1 via fasteners 158 to provide mass and rigidity proximate to the circuit board 116-1 (and window portion 156) and to decouple the circuit board 116-1 from the actuator body 108-1 to limit excitation of vibration modes of the actuator block or body 108-1.

Figure 5:
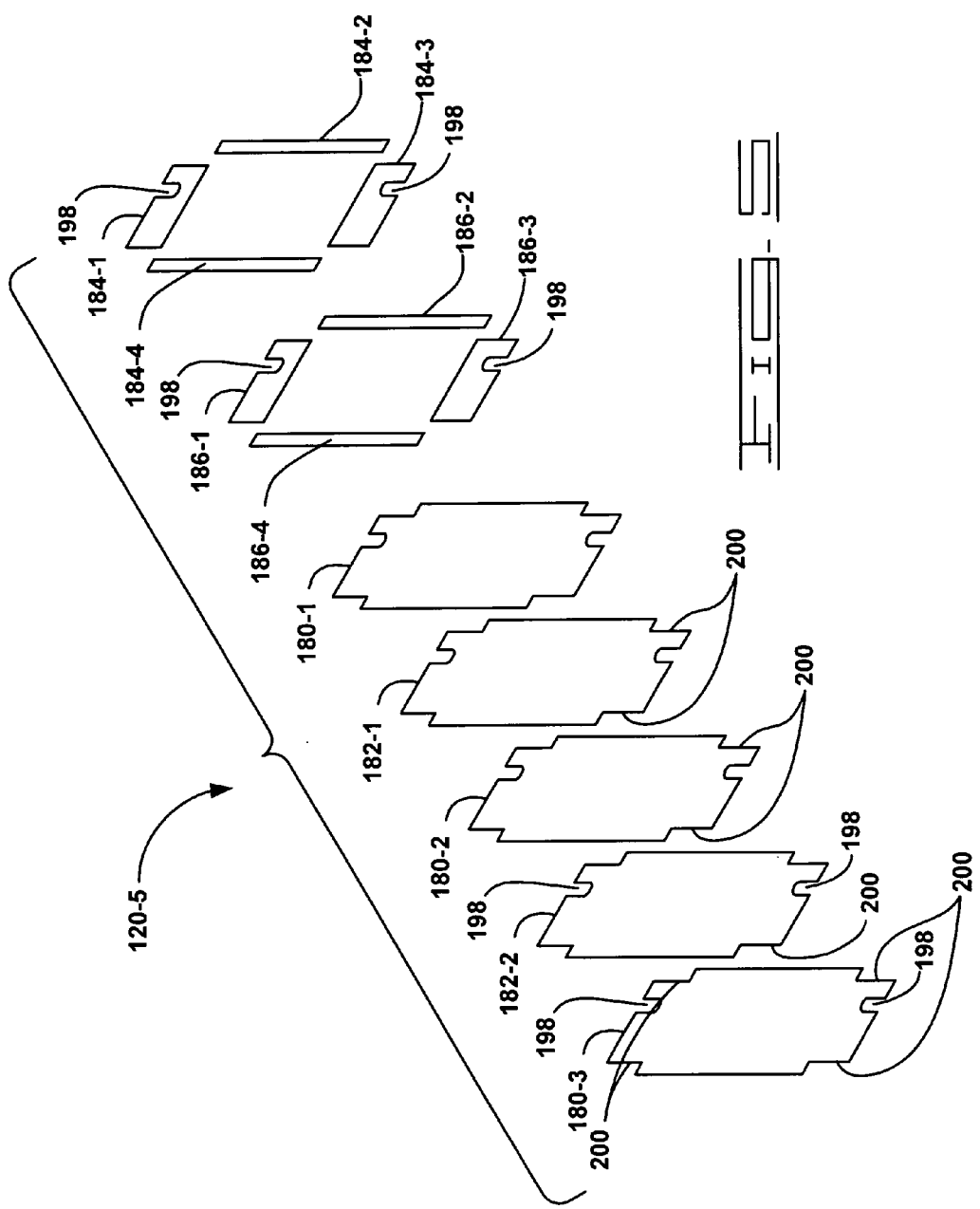
FIG. 5 is an exploded view of an embodiment of a damping assembly interposed between a circuit board or circuit portion and an actuator block of a head actuator assembly.

FIG. 5 is an exploded view of an embodiment of a damping assembly or interface 120-5 including a plurality of plates 180 secured relative to intermediate adhesive layers 182. In particular, in the embodiment shown the damping assembly or interface 120-5 includes a first damper plate 180-1, a second damper plate 180-2 and a third damper plate 180-3. Plates are formed of a relatively rigid material such as stainless steel. Damping plates 180-1, 180-2, 180-3 are secured via adhesive layers 182-1, 182-2 therebetween. In the embodiment described, adhesive layers are formed of a resilient or viscous material to provide a constraining layer between rigid plates. As shown, the damping assembly 120-5 includes damper pads 184-1, 184-2, 184-3, 184-4 adhesively secured relative to the rigid plates 180 via adhesive strips 186-1, 186-2, 186-3, 186-4 to form a composite structure which interfaces relative to portion 154 of the actuator assembly.

Figure 6:
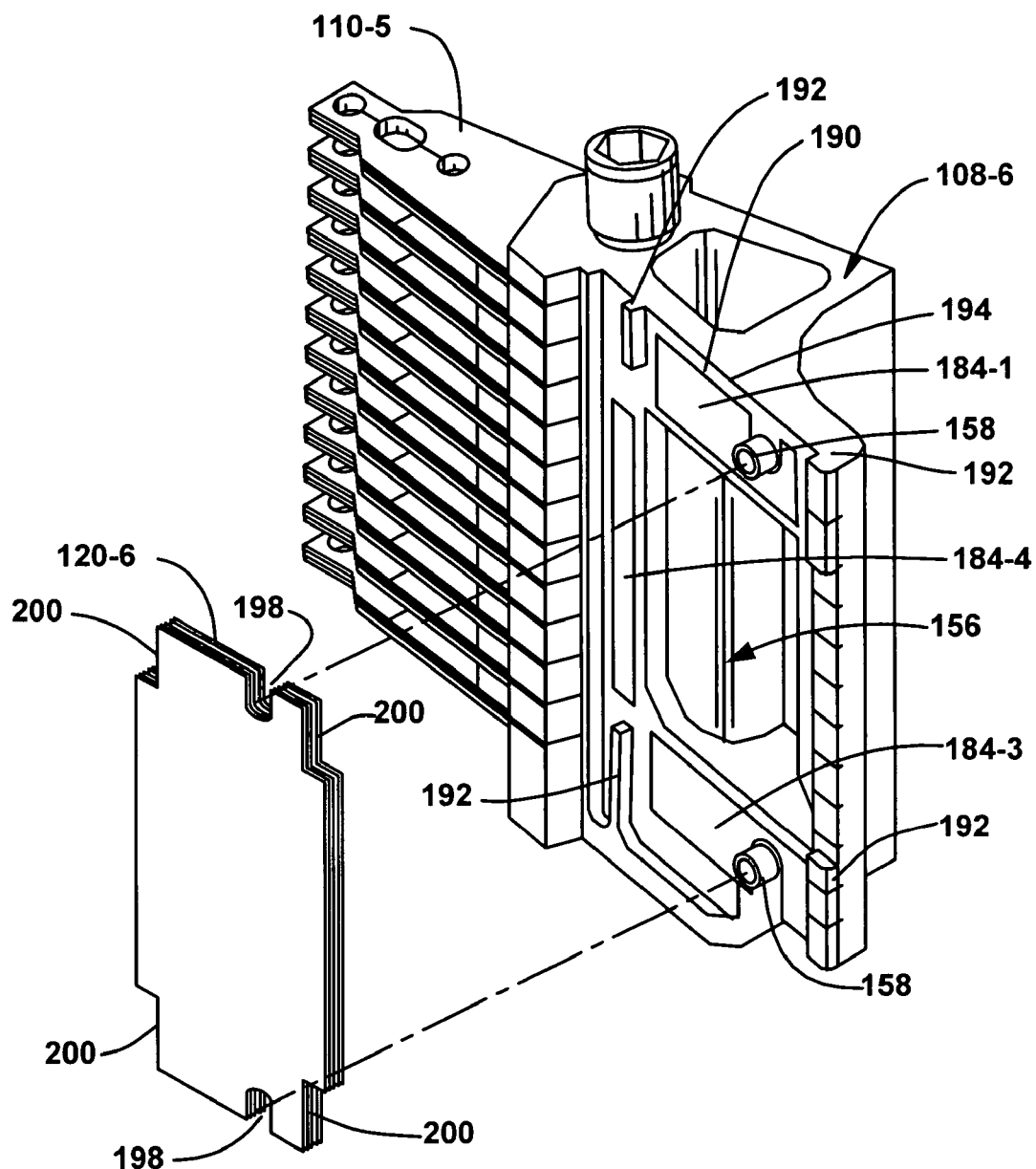
FIG. 6 is an exploded view of an embodiment of a damping assembly relative to a circuit interface portion of an actuator body or block.

In particular in the embodiment of FIG. 6, damper pads 184-1, 184-2, 184-3, 184-4 are arranged to about window 156. The damper pads 184-1, 184-2, 184-3, 184-4 are adhesively secured to plate 180-1 to form the composite assembly which seats into a recess 190 formed by ribs 192 along recessed interface surface 194 as illustrated in FIGS. 6–7. As shown, pads 184 and adhesive strips 186 include cutouts 198 so that the pads and strips are contoured about fasteners 158. Similarly plates 180 and adhesive layers 182 have recessed corner portions 200 and cutouts 198 to contour plates 180 and adhesive layers 182 about ribs 192 and the fasteners 158. Pads 184 abut the recessed interface surface 194. Thus as shown in FIG. 7, the damping assembly is interposed between the circuit interface portion of the actuator body or assembly and the circuit board or portion 116–7 to control excitation of vibration modes of the actuator assembly, for example to control excitation of a body torsion mode of the actuator assembly.

The dimension or rigidity of the damper plates or assembly is designed to provide rigidity and mass proximate to the circuit board or portion to control excitation of vibration modes of the actuator body or block. In an illustrated embodiment, the damper plates have variable thickness dimension. In particular, the damper plate 180-1 proximate to the interface surface has a relatively thin thickness dimension and damper plates 180-2, 180-3 have a progressively larger thickness dimension in a direction away from the interface surface of the actuator assembly. In the illustrated embodiment, damper plate 180-1 has a thickness dimension of approximately 4 mils, damper plate 180-2 has a thickness dimension of approximately 6 mils and damper plate 180-3 has a thickness dimension of approximately 9 mils although application is not limited to any specific dimension or specific damper plates to decouple the actuator body from vibration modes of the circuit board or interface therefor.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the actuator block damper system while maintaining substantially the same functionality without departing from the scope and spirit of the present invention. In addition, although the preferred embodiment described herein is directed to an actuator block damper system for a servo writer, it will be appreciated by those skilled in the art that the teachings of the present invention can be applied to other storage devices such as disc drives, without departing from the scope and spirit of the present invention.

What is claimed is:

1. An actuator assembly comprising:
    an actuator block including at least one actuator arm extending therefrom;
    a circuit assembly supported by the actuator block; and
    a damping assembly interfaced between the actuator block and the circuit assembly, the damping assembly comprising a plurality of rigid damper plates.

2. The actuator assembly of claim 1 further comprising at least one adhesive layer interposed between the plurality of rigid damper plates.

3. The actuator assembly of claim 1 wherein the damping assembly includes at least one damper pad.

4. The actuator assembly of claim 3 wherein the damper pad is formed of a viscoelastic material.

5. The actuator assembly of claim 1 wherein the plurality of rigid damper plates includes a first damper plate, a second damper plate and a third damper plate, and wherein each of the first, second and third damper plates have a progressively larger dimension in a direction away from an interface surface of the actuator block.

6. The actuator assembly of claim 1 wherein the damping assembly is positioned proximate to a circuit interface portion of the actuator block, wherein the circuit interface portion includes a window, and wherein the damping assembly includes at least one rigid damper plate proximate to the window.

7. The actuator assembly of claim 1 wherein circuit interface portion includes a plurality of ribs forming a recess and the circuit assembly abuts the plurality of ribs and the damping assembly is seated in the recess between the circuit assembly and the actuator block.

8. A servo writing apparatus comprising:
a spindle assembly;
a servo writing assembly including an actuator assembly including at least one head coupled thereto;
a circuit assembly supported by the actuator assembly; and
a damping assembly interposed between the actuator assembly and the circuit assembly, the damping assembly comprising a plurality of rigid damper plates.

9. The servo writing apparatus of claim 8 wherein the plurality of rigid damper plates are coupled via at least one adhesive layer.

10. The servo writing apparatus of claim 8 wherein the damping assembly further includes damper pads which abut an interface surface of the actuator assembly.

11. The servo writing apparatus of claim 8 wherein the plurality of rigid damper plates have a progressively larger thickness dimension in a direction away from an interface surface of the actuator assembly.

12. The servo writing apparatus of claim 8 wherein the plurality of rigid damping plates includes a first damping plate, a second damping plate and a third damping plate having different thickness dimensions.

13. A method comprising the steps of:
aligning a circuit assembly relative to an interface surface on an actuator block;
interposing a damping assembly between the circuit assembly and the interface surface, the damning assembly comprising plurality of rigid damper plater; and
securing the circuit assembly relative to the interface surface of the actuator block having the damping assembly between the circuit assembly and the actuator block.

14. The method of claim 13, wherein the damping assembly of the interposing step further comprises at least one viscoelastic layer disposed between said plurality of rigid damper plates.

15. The method of claim 13, wherein the damping assembly of the interposing step comprises a first damper plate, a second damper plate and a third damper plate, and wherein each of the first, second and third damper plates have a progressively larger dimension in a direction away from an interface surface of the actuator assembly.

* * * * *